May 2, 1967     T. D. LODE     3,317,814
THERMORESISTIVE CHOPPER
Filed Jan. 4, 1965
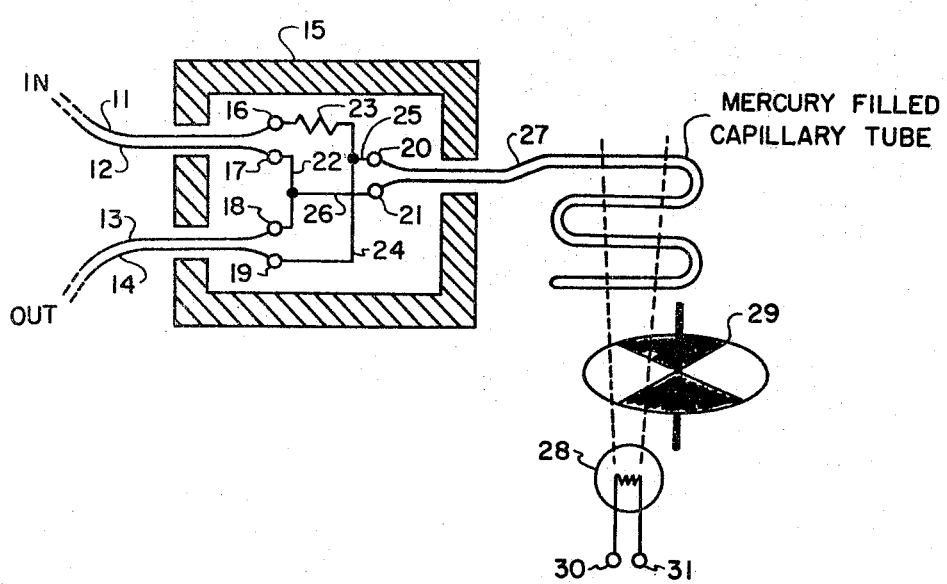
INVENTOR
TENNY D. LODE

United States Patent Office 3,317,814
Patented May 2, 1967

3,317,814
THERMORESISTIVE CHOPPER
Tenny D. Lode, Madison, Wis., assignor to Rosemount Engineering Company, Minneapolis, Minn., a corporation of Minnesota
Filed Jan. 4, 1965, Ser. No. 422,965
4 Claims. (Cl. 321—44)

This invention relates to electrical choppers for the conversion of low level D.C. signals into A.C. signals which may be more easily amplified and measured. More particularly, it relates to a novel variable resistance element for use in such chopper systems which is particularly free from errors due to internally generated voltages and currents.

The amplification or measurement of low level unidirectional voltage or current signals is often difficult because of errors such as thermoelectric potentials generated within the measurement circuit. It is a common practice to chop or modulate a low level unidirectional signal into a corresponding alternating voltage signal which may be more readily amplified. In a conventional chopper circuit, two resistance elements are connected in series across a D.C. voltage to be measured. The resistance of one element is periodically varied causing a corresponding variation in the division of the applied D.C. voltage across the two resistance elements. The resultant alternating voltage across one resistance element is amplified and used as a measure of the applied unidirectional voltage. A number of chopping circuits and chopping elements are known. Perhaps the simplest form of chopping element is a pair of opening and closing contacts. Photosensitive resistors, illuminated by light of periodically varying intensity, are also used.

A limitation of the sensitivity of a chopper circuit is the electrical noise generated by the process of varying the magnitude of the variable resistance element. One method is to use a temperature sensitive resistance element and periodically vary the temperature. If the resistance element and the temperature pattern were completely symmetric about a midpoint, there would be no thermoelectric voltages generated. However, minute variations in the structure of the resistance element and/or the heating pattern would generate thermoelectric error voltages which could not be distinguished from an actual unidirectional voltage input. Nonsymmetric arrangement of crystal grain boundaries and/or slight differences in impurity levels may also cause the generation of measureable error voltages in the presence of alternate heating and cooling.

An object of this invention is the chopping or conversion of low level unidirectional signals into alternating signals by means of a circuit including a periodically varying resistance element. A further object is to provide a variable resistance element for such use which will be particularly free from internally generated error voltages and/or currents.

In a particular form of the present invention, a liquid metal temperature sensitive resistor is used as a variable resistance element in a chopper circuit. Chopping is accomplished by alternate heating and cooling of the temperature sensitive resistance element. The use of a liquid thermoresistive element eliminates some of the error voltages and currents which would be generated by the heating and cooling of a solid thermoresistive element.

In the drawing:
The figure is a schematic illustration of a first form of the invention.

Referring now to the drawing, the figure includes a pair of input leads, 11 and 12, and a pair of output leads, 13 and 14, extending into the interior of a uniform temperature enclosure 15. Terminals 16, 17, 18, 19, 20 and 21 are in the interior of enclosure 15. Leads 11, 12, 13, and 14 connect to terminals 16, 17, 18, and 19 respectively. Line 22 connects from terminal 17 to terminal 18. Terminal 16 connects to a first side of resistor 23, the second side of which connects via line 24 to terminal 19. Terminal 20 connects via line 25 to line 24, and terminal 21 connects via line 26 to line 22. Mercury filled capillary tube 27 is connected to terminals 20 and 21. The capillary tube is preferably an electrical insulator and terminals 20 and 21 make direct electrical connection to the mercury. Capillary tube 27 winds back and forth in the neighborhood of heat lamp 28 so as to be illuminated and heated by lamp 28. Rotating shutter 29 is between capillary tube 27 and lamp 28, and serves to periodically chop thermal radiation passing from lamp 28 to capillary tube 27. The filament of lamp 28 is connected to terminals 30 and 31.

In operation, terminals 30 and 31 will be connected to a suitable source of electric power to energize lamp 28. Shutter 29 is mechanically rotated and serves to alternately transmit and block thermal radiation from lamp 28. Capillary tube 27 will be alternately heated, as thermal radiation from lamp 28 passes through an opening in shutter 29, and cooled by transfer of heat to the surroundings when radiation from lamp 28 is blocked by shutter 29. As the temperature of the mercury within capillary tube 27 periodically varies, its electrical resistance will change as a function of the varying temperature. Hence, the mercury within capillary tube 27 will appear as a periodically varying resistor connected across terminals 20 and 21. Enclosure 15 serves as a junction box with an essentially uniform internal temperature. This allows the various connections to be made at essentially the same temperature, minimizing thermoelectric voltages. Lines 11 and 12 may be regarded as input lines from a source of unidirectional voltage. Lines 13 and 14 may be regarded as output lines, for example to an alternating voltage amplifier or measuring instrument. The unidirectional voltage across lines 11 and 12 will be divided across resistor 23 and the resistance of the mercury within capillary tube 27. As the resistance of the mercury within capillary tube 27 periodically varies, the fraction of the unidirectional voltage component across terminals 20 and 21 will similarly vary. Hence, an alternating voltage component proportional to the unidirectional voltage across lines 11 and 12 will appear across terminals 20 and 21. This alternating voltage component will also appear across terminals 18 and 19 and lines 13 and 14. If desired, a capacitor may be connected in series with line 13 and/or line 14 to block the remaining unidirectional voltage component across terminals 18 and 19.

The use of a heat lamp and rotating shutter has been shown as one method for varying the temperature of a thermoresistive element. More sophisticated techniques for heating and cooling the thermoresistive element may be devised. In general, for low noise operation, it will be desirable to avoid either freezing or boiling of a liquid conductor.

The use of mercury as a liquid metal conductor has been mentioned previously. Mercury is an obvious and convenient choice at normal temperatures. Other thermoresistive substances may also be used within the spirit of this invention.

The present invention has been described as a method and means for the chopping or conversion of a unidirectional signal into a corresponding alternating voltage component. The term unidirectional in the specification and claims is relative and should be considered as referring to signals which are of essentially one polarity for a period of time which is relatively long with respect to one cycle of the chopping frequency.

I claim:
1. Means for generating an alternating voltage component having a magnitude corresponding to a unidirectional voltage signal including a source of said unidirectional voltage signal, an input circuit including a plurality of resistances in series, a resistance element within said input circuit including a path through a liquid conductor whose resistance varies as a function of temperature, means for periodically varying the temperature of said liquid conductor, an output load circuit, and means connecting said output load circuit to said input circuit.

2. Means for generating an alternating voltage signal having a magnitude corresponding to a unidirectional voltage signal including a source of said undirectional voltage signal, first and second input terminals connected to said source, first and second output terminals, an output load circuit connected to said output terminals, a first resistance element connected between said first input terminal and said first output terminal, a second resistance element connected between said second input terminal and said first output terminal, means connecting said second output terminal to at least one of said input terminals, said first resistance element including a path through a liquid conductor whose resistance varies with temperature, and means for periodically varying the temperature of said liquid conductor thereby varying the resistance thereof.

3. Means for generating an alternating voltage signal having a magnitude corresponding to a unidirectional voltage signal including a source of said unidirectional voltage signal, first and second input terminals connected to said source, first and second output terminals connected to an output load circuit, first and second resistance elements, means including said first resistance element connecting said first output terminal to said first input terminal, means including said second resistance element connecting said first output terminal to said second input terminal, means connecting said second output terminal to at least one of said input terminals, said first resistance element including a path through a liquid conductor whose resistance varies with temperature, and means for alternately heating and cooling said liquid conductor.

4. A thermoresistive chopper for modulating a low level direct current signal into an alternating voltage signal comprising; an elongated container, a liquid conductor within the container having an electrical resistance which varies with temperature, first connecting means to supply the direct current signal through the liquid conductor, means for cyclically varying the temperature of at least a portion of the liquid conductor thereby modulating the direct current signal into an alternating voltage signal having an amplitude corresponding to the direct current signal amplitude, and second connecting means coupled to a portion of the liquid conductor for supplying the alternating voltage signal to auxiliary equipment.

References Cited by the Examiner

UNITED STATES PATENTS

| | | | |
|---|---|---|---|
| 2,611,855 | 9/1952 | Turner | 219—212 X |
| 2,680,224 | 6/1954 | Carton | 321—1.5 |
| 2,942,113 | 6/1960 | Handel | 323—74 X |
| 2,948,799 | 8/1960 | Weise | 323—68 X |
| 3,075,063 | 1/1963 | Salton | 219—494 X |

JOHN F. COUCH, *Primary Examiner.*

A. D. PELLINEN, *Assistant Examiner.*